United States Patent [19]

Schaefer et al.

[11] Patent Number: 4,904,454
[45] Date of Patent: Feb. 27, 1990

[54] REACTOR FOR PRODUCING FURNACE CARBON BLACK

[75] Inventors: Gerhard Schaefer, Dortmund; Peter Kopietz, Froendenberg, both of Fed. Rep. of Germany

[73] Assignees: KG Deutsche Gasrusswerke GmbH & Co., Dortmund; Degussa Aktiengesellschaft, Frankfurt am Main, both of Fed. Rep. of Germany

[21] Appl. No.: 229,761

[22] Filed: Aug. 5, 1988

Related U.S. Application Data

[63] Continuation of Ser. No. 25,762, Mar. 13, 1987, abandoned.

[30] Foreign Application Priority Data

Mar. 22, 1986 [DE] Fed. Rep. of Germany ....... 3609847

[51] Int. Cl.⁴ .................................................. C09C 1/50
[52] U.S. Cl. ................................... 422/151; 422/156; 422/158
[58] Field of Search ......................... 422/151, 156, 158; 423/450, 456, 461

[56] References Cited

U.S. PATENT DOCUMENTS

| | | | |
|---|---|---|---|
| 4,106,912 | 8/1978 | Dollinger et al. | 422/151 |
| 4,213,939 | 7/1980 | Ruble | 422/151 |
| 4,250,145 | 2/1981 | Pobst, Jr. et al. | 422/151 |
| 4,320,090 | 3/1982 | Hunt | 422/150 |
| 4,536,603 | 8/1985 | Sprouse et al. | 48/210 X |

FOREIGN PATENT DOCUMENTS

| | | |
|---|---|---|
| 1592979 | 3/1973 | Fed. Rep. of Germany . |
| 1592852 | 9/1974 | Fed. Rep. of Germany . |
| 2304029 | 11/1976 | France ............................ 422/151 |

Primary Examiner—Joye L. Woodard
Attorney, Agent, or Firm—Beveridge, DeGrandi & Weilacher

[57] ABSTRACT

A tubular furnace as a reactor for producing carbon black is disclosed having a constriction in at least the area of the spray device for the carbon black starting material which is oriented along the reactor axis. A combustion chamber for generating the gaseous pyrolysis medium for the carbon black raw material is laterally located in front of the constriction. The central axes of the reactor tube and the combustion chamber are in the same plane and are essentially at right angles to one another. In addition, a method for producing furnace carbon blacks is disclosed in which the described reactor can be used.

10 Claims, 3 Drawing Sheets

REACTOR FOR PRODUCING FURNACE CARBON BLACK

This application is a continuation of application Ser. No. 025,762, filed Mar. 13, 1987, now abandoned.

INTRODUCTION AND BACKGROUND

Most of the world production of carbon blacks, especially the furnace carbon blacks required for the filling of heavy-duty rubber articles, are produced according to the furnace carbon black or oven carbon black method. Basically, in this method a hot rotating mass of combustion gases is formed by the combustion of gaseous or liquid fuels, usually natural gas at the present time. Tubular flow reactors are generally used which are usually horizontally oriented and covered in a fire-resistant manner. With tangential introduction of air to create a hot rotating mass, a liquid hydrocarbon with a highly aromatic composition, e.g. a carbochemical or petrochemical oil, is injected, usually axially, by means of an oil injector extending into the reactor zone with a single-component or two-component atomizer.

The introduced hydrocarbon is essentially cracked at the high temperatures of approximately 1400°–1800° C. into carbon (carbon black) and hydrogen. A few known methods generate combustion waste gases in a separate precombustion chamber located in front or ahead of the actual reaction zone wherein the carbon black is formed. In these methods, combustion air which has usually been preheated in heat exchangers with the reaction mixture leaving the reactor to 300°–600° C. or higher is tangentially blown by a rotary piston or turbo-blower into the combustion chamber through one or several (symmetrically arranged in the latter instance) conduit openings positioned on the circumference of the combustion chamber in such a manner that a swirling flow is created.

A fuel such as burnable gas, e.g. from a burner/injector combination as is described in DE-PS 24 10 565, is added into this intentionally induced swirling flow so that a mass of hot, rotating gases is created which moves forward in a helical manner, confined by the inner walls of the reaction tube, to the reaction zone where the gas, now burned-out to a great extent, is charged with the carbon black raw material by spraying in very fine particles.

It is considered to be an important condition for the production of furnace carbon blacks that the mixing of the carbon black raw material into the hot combustion gases should occur rapidly. An effective means of inducing a rapid and intensive mixing can be to allow the rotating hot gaseous mass to pass through a narrow area in the reactor after, during or shortly before the injection of the carbon black raw material. This narrow area consists of a constriction of the inner reactor zone contour achieved by means of suitable built-in elements such as, e.g. a so-called restrictor ring or by other built-in elements whose contours can be, e.g. conical, Laval-shaped, Venturi-shaped or with some other shape.

The swirling flow of hot combustion gases can also be created in some other manner. One possibility is to add the fuel from the periphery of a combustion chamber located in front, e.g. by means of introducing it into tangentially supplied combustion air.

Another possibility is described in DE-AS 15 92 852 which provides either for injecting the fuel in an axial direction into one end of a longitudinally extended cylindrical combustion chamber positioned laterally and tangentially at the upstream end of a Venturi reactor, or introducing the air tangentially into the same end of the combustion chamber and then introducing the hot combustion gases created tangentially into the end of the reactor chamber located upstream and designed as cylindrical section.

Another possibility for introducing combustion air and fuel makes no use of a separate combustion chamber and mixes combustion air and fuel in one or several conduits which connect in an essentially tangential position in the vicinity of the front of the reactor in round or slotlike feed conduits into the reactor. Gas lances are movably located in the conduits in order to produce the air/burnable gas mixture. If a liquid fuel is to be used instead of burnable gas, the gas lances are replaced by suitable single-component or two-component atomizers.

However, combustion air and fuel can also be introduced by separate conduits tangentially positioned on the circumference of the front part of the carbon black oven, whereby they are not mixed and burned until they are within the swirling flow formed in the furnace.

In all these oven designs, a helically rotating mass of hot combustion products is produced in the front part of the reactor into which mass the carbon black raw material can be sprayed after a certain distance, optionally in front of, directly into, or a short distance after, the location of a narrow area in the reaction zone. This is referred to as the zone of constriction. The premixing of fuel and combustion air before their entrance into the reactor makes it possible to design the latter more compactly. Thus, all previously discussed designs for furnace carbon reactors have the goal of creating a strong swirling action of the gaseous heating medium for the cracking reaction, whereby the swirling gaseous mass is affected but not eliminated if a constriction is used. The effect of the swirling motion of the gases is considered to be that the small droplets of liquid injected into the hot combustion gases during the injection of the carbon black raw material are divided or sheared into still small particles by means of spontaneous change of direction due to the turbulence. Direct proportionality with the swirling intensity was assumed for the shearing forces created thereby.

The generation of rotating gaseous masses according to prior known methods requires a considerable expenditure of mechanical energy. Since a rotating eddy of hot gas does not rotate quite symmetrically under practical conditions but rather wobbles somewhat and also since an absolute rotational symmetry of the injected oil in relation to the eye of the vortex cannot be achieved, droplets of oil tend to deposit on the reactor wall. That is, on the jacketing in walled reactors, the oil droplets form and carbonize there. This deposition tends to loosen parts of the wall and also brings about a change of the carbon black oil/hot gas ratio. This can cause the iodine number to rise; also, the quality parameters set for the desired carbon black can be changed, since oil is removed from the formation of carbon black. Thus, deposited coke grows unsymmetrically on parts of the oven interior for the reasons cited above, and as a result of chemical and mechanical actions causes damage to the oven walls and contaminates the product by means of loosened particles.

In view thereof, there was a great need to find a method with which the entire range of specifications at least of the activated carbon blacks can be achieved and in which the cited problems rarely or no longer occur.

As a result of the invention, a new oven design was developed as well as a method which can be carried out to produce furnace carbon black, which method in the light of the flow conditions prevailing in the reactor proceeds in a new way and solves the described problems to a great extent.

BRIEF DESCRIPTION OF THE DRAWINGS

The invention is illustrated in the accompanying drawings wherein.

SUMMARY OF THE INVENTION

According to the invention, a reactor for producing furnace carbon black by thermal decomposition of liquid hydrocarbons in hot combustion gases is formed of a plurality of elements including a first tubular section with a circular section which is closed at the front end by a front wall, open at the back end, and which can communicate with and can be connected to a heat exchanger, carbon black separation means and collection means. The tube is jacketed in a fire-resistant manner in accordance with the state of the art and is connected to and leads to a second section which symmetrically constricts the cross-sectional area of the tube. This second section is followed by a third, cylindrical or conically opening tube section which exhibits a diameter at the constricting element of at least equal to that of the constriction section and is provided at the rearward end with at least one spray nozzle for a liquid quenching medium. The first section in the jacketed tube communicates with a combustion chamber comprising means for feeding and reacting a fuel with a gas containing oxygen and whereby a movable lancelike spray device for introducing the carbon black raw material is present coincident with the tube axis in a gastight manner and extends through the front wall of the reactor tube.

An important feature of the invention resides in the combustion chamber being connected by its open end to the side opening in the first section of the reactor tube in such a manner that the axis of the combustion chamber and the axis of the reactor tube are essentially in the same plane and both axes are preferably at right angles to each other. The carbon black raw material spray device is moveable from the front wall of the first reaction tube section into the second tube section until just past the zone of constricted cross-sectional area.

It is preferable if the combustion chamber has the same cross-sectional area as the first section reactor tube to which it is connected and is contained and welded in the latter in a recess adapted to its circumference.

The combustion chamber can also be connected to the reactor tube via a flanged tubular intermediary member which is contained and welded in an opening of the reactor tube.

Thus, the new reactor of the present invention is fundamentally of the type of furnace ovens in which combustion are and burnable gas pass premixed into the reaction zone and are burned, and wherein a narrowing or constriction in the inner contour or cross-sectional area exists in the front portion of the device. Also, present in the reactor is a carbon black raw material atomizer operating on the single-component or multicomponent principle which is in the form of a lance that can be moved forward from the front wall of the reactor up to, into or a little past the zone of constriction. However, the design of the invention differs from these previously known reactors in that the combustion air/burnable gas mixture is formed and reacted in a combustion chamber that is laterally oriented with respect to the front jacketed reactor section, and wherein the central axis of the combustion chamber is located essentially, and particularly precisely in the plane of the central axis of the reactor tube.

This novel orientation of the apparatus of the invention establishes the prerequisite for the basic concept of the invention of bringing the carbon black raw material into contact with a non-swirling but turbulent hot combustion gas.

The intersecting axes of reactor tube and combustion chamber cylinder do not have to be precisely at a right angle to one another, although this arrangement is preferred. Thus, combustion chamber axis and reactor tube axis can form an angle with one another which is somewhat smaller or greater than 90°, whereby the latter embodiment was found to be more advantageous than the former.

It was surprisingly found that the reactor of the invention makes possible not only a considerably smoother operation at the desired settings but also enables obtaining carbon blacks with high DBP values. In addition, a considerably improved production can be achieved as a consequence of increased air and oil throughput. Finally, the oven permits the use of highly preheated air as well as of oxygen or air/oxygen mixtures. Thus, the oven can be operated under conditions in which the wall would melt in conventional ovens. The reactor oven is very compact in its longitudinal dimensions because the combustion chamber is not located in front of it. In addition, the first reactor oven section which operates under especially hot conditions can be designed with a diameter smaller than that of traditional ovens operating with swirling action, thereby enabling an economic reduction in the required mass of wall material resistant to high temperatures.

In the known reactors operating with a swirling action of the combustion gases a zone of rather strong turbulence frequently arises directly at the point when the oil is introduced or at the point when a constricted area is passed. However, in the reactor of the invention, the spray cone of the carbon black raw material creates a non-swirling yet particularly very turbulent mixture of combustion gas which is caused by the oven geometry in the region of the combustion chamber and the first oven section located immediately thereafter. The geometry of the reactor oven abruptly deflects the burned-out, hot combustion gas which has sharply expanded in relation to the initial volume of the reactants.

These geometric conditions are not present in several known oven designs in which a non-swirling axial flow of combustion air and burnable gas or of already-formed combustion gas (U.S. Pat. Nos. 2,851,337; U.S. 2,971,822 and DE-PS 15 92 979) prevails in the reactor tube. Neither do these conditions arise in ovens in which the formation of the combustion gas, which is associated with a considerable increase in volume, does not occur until shortly before a narrow area with adjacent feed of carbon black raw material into combustion air flowing with or without swirling action, preheated to customary temperatures and therefore moved with a practically constant volume.

U.S. Pat. No. 4,320,090 shows a carbon black reactor in which the combustion gases are tangentially introduced into a chamber located in front of the formation zone of the carbon black and are then divided into several currents by means of a perforated disk designated as flame holder which is mounted at the downstream chamber end, leaving an axial opening free and is provided over its surface with several additional openings. The perforated disk functions as a gas-permeable dividing wall between this chamber and a cylindrical section of the carbon black oven located downstream. The lancelike spraying device for the carbon black raw material runs axially through this chamber and terminates in the space around the level of the gas permeable dividing wall. Therefore, this chamber can be designated as a combustion or burn-out chamber located in front of the actual reactor and with a tangential feed for the combustion mixture. Since the dividing wall provided with openings is defined as a flame holder which stabilizes the combustion mixture, it must be assumed that the space located downstream from the dividing wall also functions in part as a combustion chamber.

Thus, the reactor according to U.S. Pat. No. 4,320,090 does not contain the division of the reactor oven apparatus into a first oven section which is connected to a combustion chamber in such a manner that the axes of both are essentially in the same plane and are preferably at right angles to one another, and into a constricting element as the second section and into a third oven section.

According to a preferred, very advantageous embodiment of the invention, a gas lance for burnable gas or a lancelike spray device for burning oil, preferably in a longitudinally movable manner, is connected through the front wall of the combustion chamber formed of a cylinder closed on one side. At least one conduit for the combustion air is directed essentially vertically with respect to the combustion chamber cylinder axis and extends through the jacket of the combustion chamber cylinder into the area of the reaction zone. The axis of this conduit is essentially in the same plane as the axis of the combustion chamber cylinder.

The currents of fuel and combustion air which meet one another at about right angles are mixed thereby under great turbulence. The hot combustion gas flows from this first turbulence zone into the reactor and an extremely great turbulence is generated with the avoidance of a swirling current by the impact on the opposite reactor wall, the backwash occasioned thereby and by the deflection effects in the direction of the longitudinal axis of the reactor. Contrary to all expectations, the inner wall surface of the reactor wall opposite the combustion chamber is not adversely affected in any way by the flow guidance according to the invention.

The combustion chamber is dimensioned essentially according to the operating capacity of the oven and thus according to the amounts of hot gas required to supply the oven under the operating conditions in question. Its length is dimensioned in such a manner that as complete a combustion of the fuel as possible is achieved before the entrance into the reactor tube. The combustion chamber opening to the reactor tube can have at the most the diameter of the first cylindrical reactor tube section but may also have smaller diameters than that of this preferred instance of the invention.

The reactor of the invention is provided with a constriction zone in the form of a rotationally symmetrical element positioned on the inner wall of the reactor or formed as a part of its wall. Three especially suitable versions are to be considered for the form of this constriction zone. Thus, an especially suitable embodiment of the reactor of the invention provides that the constricting element in the reactor tube is continuously cylindrical or taperingly conical in the front and cylindrical in the back part or taperingly conical in the front part and opens out conically in the back part.

The inclination of the cones can vary within a wide range. A preferred inclination of the jacket cones on the entrance side is 18° in relation to the longitudinal reactor axis and 3.2° on the exit side, likewise in relation to the longitudinal reactor axis.

At the point of the greatest constriction, the element usually exhibits a surface parallel to the tube axis; the minimum length of this level section is selected so as to assure mechanical stability and permanence. Generally, its length is selected so as not to be greater than its inside diameter.

The inside width of the constriction can be 0.30 to 0.55 of the inner diameter of the first reactor zone.

The beginning of the constriction or of the constricting element is preferably located directly downstream from the mouth of the combustion chamber; however, it can also be located at a distance, corresponding e.g. to 1-3 times the diameter of the combustion chamber, calculated from the central axis of the combustion chamber.

According to the invention, the new reactor has three important zones; namely:

1. the first, cylindrical section, which is connected to the combustion chamber, begins at the front wall of the reactor and ends at the beginning of the constriction element, e.g. the start of a tapering cone;

2. the constriction element itself, which defines the zone of constriction and exhibits a differing length, depending on its geometric design; and 3. the third section, which begins where the narrowest section of the constriction element, designed with a circular cross-section, ends. It constitutes the essential part of the zone for the formation of carbon black and carries a device at the rear; i.e. downstream end for stopping the reaction of carbon black formation by quenching, e.g. water spray nozzles, followed by connection means for connecting to the customary devices for heat exchange, for the separation of the carbon black from the process gas and for collection of the carbon black for optional further processing.

The third section can be designed in various ways, depending on its geometrical form and its diameter. Thus, the third section of the reaction zone can be:

(a) cylindrical and have the same diameter as the first section, or also a greater or a smaller diameter than the latter, (b) have the form of an opening cone and, optionally, also comprise a cylindrical section which follows it, (c) be provided with other built-in parts, baffle plates, constrictions and the like, such as are sometimes provided in known furnace ovens.

However, a cylindrical third reactor section with the same diameter as the first section is preferred.

The atomizer lance for the carbon black raw material can be moved in the front reactor section with its mouth between the front wall and a point just after the constriction or narrow area. If the beginning of the narrowest point of the constriction, viewed in the direction of flow, is designated as position zero, then the mouth of the lance is moved, as a function of the type of carbon black to be produced, from this position up to −4 backwards (minus value) and up to 1.6 forward (plus value), in relation to the diameter of the narrow area. The positions between −1.5 and +0.5 are particularly advantageous; however, in many instances positions between −0.5 and 0 are used.

Another object of the invention is a method for producing furnace carbon blacks, especially when using the reactor of the invention. In carrying out this object of the invention; hot combustion gases generated in a combustion chamber zone are fed to a longitudinally extended reactor zone located essentially in the plane of its central axis and oriented essentially at right angles to the axis of the combustion zone. Then the carbon black material is charged by spraying it into the reaction zone just before, in or just after a constriction zone in the inner contour of the reactor.

DETAILED DESCRIPTION OF THE INVENTION

The invention is explained in more detail below in two embodiments with reference made to two advantageous reactor designs shown in the drawings.

Figure 1:
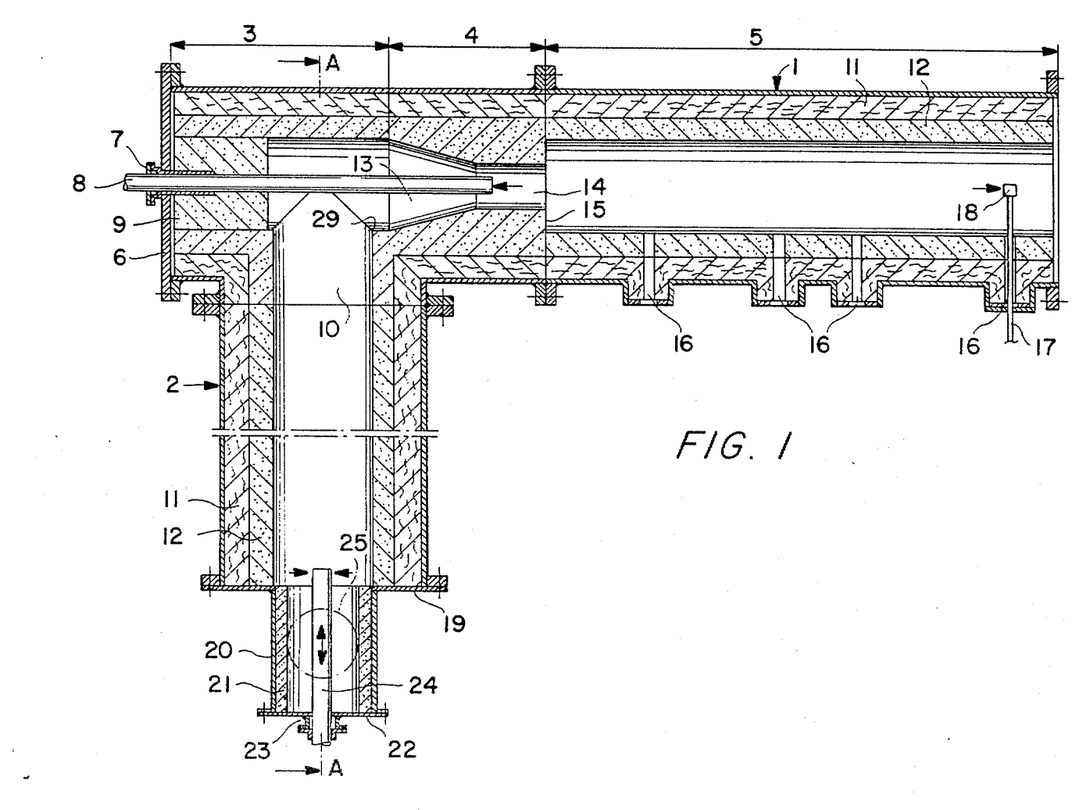
FIG. 1 is a sectional view of a furnace apparatus of the invention.

FIG. 1 shows a longitudinal section through a reactor of the invention with combustion chamber and a constriction element which is taperingly conical on its forward end and cylindrical on its rearward (downstream) side.

Figure 2:
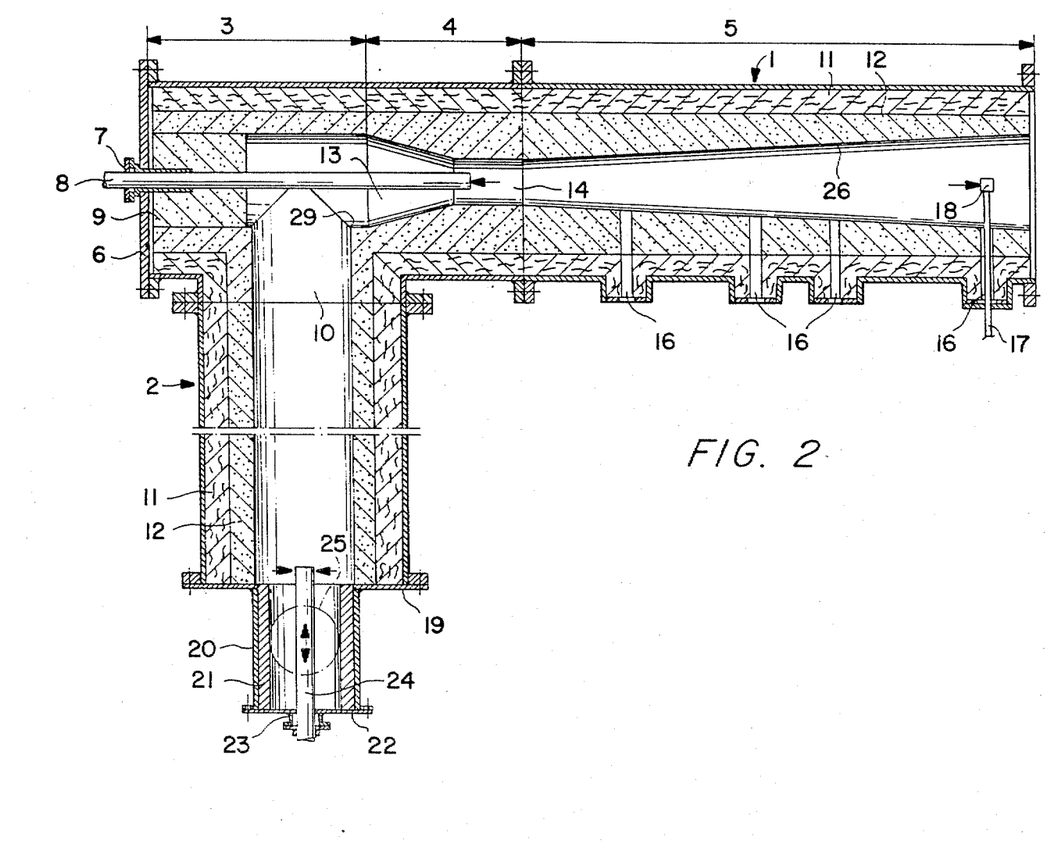
FIG. 2 is a sectional view of another embodiment of a furnace apparatus of the invention.

FIG. 2 shows a longitudinal section through a modified reactor of the invention with combustion chamber and a constriction element which is taperingly conical on its forward end and opens out conically on its downstream side.

Figures 3, 4, 5:
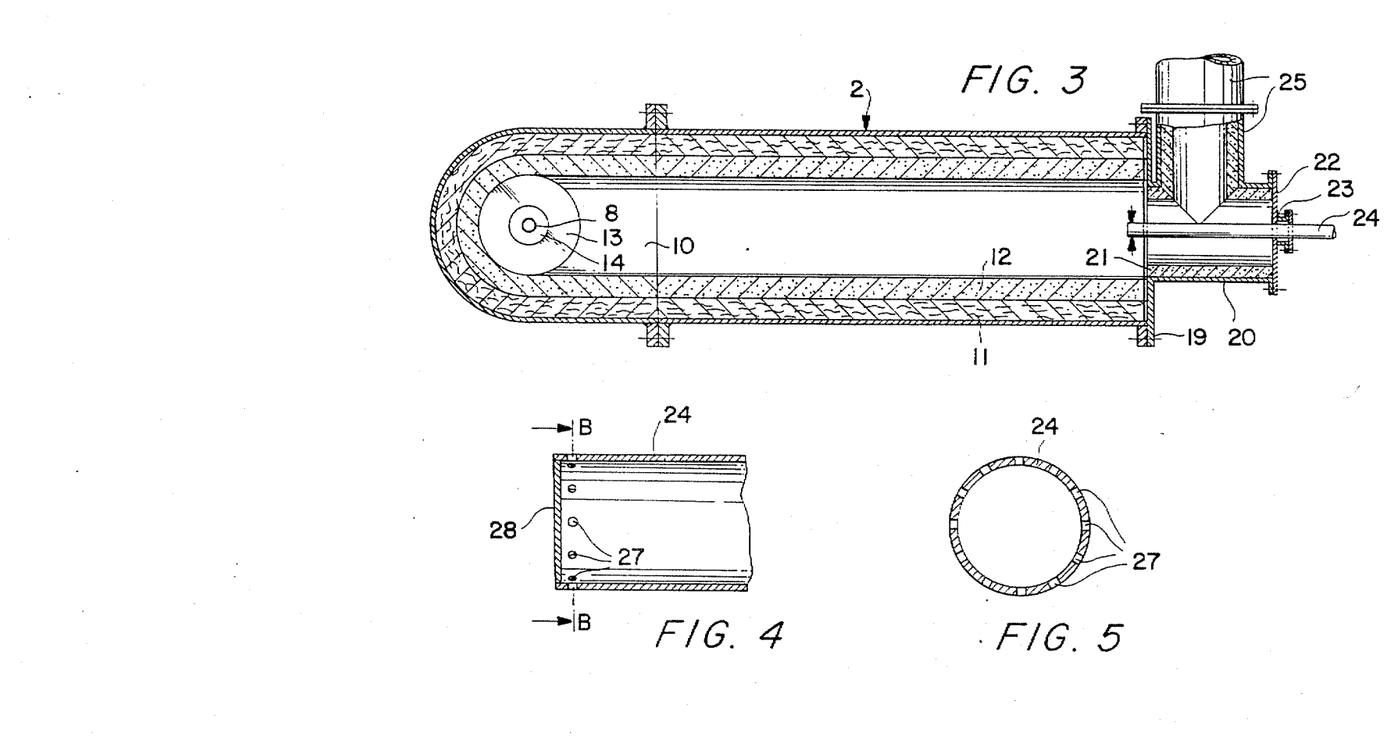
FIG. 3 is a sectional view taken through the plane A—A of FIG. 1.
FIG. 4 is a partial sectional view of a fuel injection conduit.
FIG. 5 is a cross-sectional view of the conduit of FIG. 4.

FIG. 3 shows a section through the reactor of FIG. 1 along line A—A.

FIG. 4 shows a longitudinal section through the tip of the gas lance for burnable gas in the combustion chamber of FIG. 3.

FIG. 5 shows a section through the tip of the gas lance of FIG. 4 along line B—B.

FIG. 6 is a cut away view of an alternate embodiment of the reactor.

The carbon black reactor shown in FIG. 1 comprises an externally cylindrical part (1) constituting the overall tubular reactor with a total length of, for example, approximately 4.85 m, which has connected to it a combustion chamber (2) which can also be externally of a tubular configuration. The combustion chamber (2) is laterally oriented to the main axis of the reactor, and is, for example, approximately 2.40 m long. For example, both tubular parts can have an outer diameter of almost 1 meter. These dimensions are illustrative and can be varied.

The carbon black reactor (1) is jacketed internally with a first layer (11) consisting of a conventional insulating compound followed on the inside thereof by a second layer which is a highly fire-resistant conventional ceramic layer (12). These substances are well known in the art.

The carbon black reactor is divided into three sections or zones (3), (4) and (5).

The first reactor section or zone (3) is fitted with a closure plate (6) on its forward or front side which is equipped coincident with the reactor axis with a stuffing box (7) for receiving the oil injection lance (8). The cross-sectional area of the first zone is usually uniform from the front end in the direction of flow, and merges directly into the second zone (4). The front closure plate (6) of the first zone (3) is provided on the reactor inside with a highly temperature-resistant filler means formed of conventional material (9) for sharply reducing the radiation of heat to the outside, which eliminates the need for a special water-cooling of the front closure plate. The ceramic wall layer (12) of the first zone (3) contains a lateral recess or bore (10) for the introduction of the combustion gases generated in the combustion chamber (2). The portions of the ceramic wall layer (12) defining the inner wall of the first zone (3) and the internal surface of the bore (10) intersect in a transverse relationship such that a sharp edge (29) is formed. The axis of the combustion chamber is at about right angles to the reactor axis and is located in the same plane as the latter; that is, the combustion gases formed in the combustion chamber enter into the reactor in such a manner that no swirl is produced. The diameter of the recess (10) corresponds to the inner diameter of the combustion chamber (2) and of the reactor zone (3) and can be, for example, 460 mm.

The second zone (4) contains the constriction element, which consists of a, for example, 725 mm long conical inlet (13) which tapers in the direction of flow, a long cylindrical part of, for example, approximately 330 mm (14) and, for example, 203 mm in diameter and a wall on the outlet side with a plane surface (15). It is manufactured from a highly fire-resistant conventional material such as ceramic and fastened in rotational symmetry with the reactor axis to the insulation layer (11).

The third zone (5) consists of a tube section cylindrically jacketed on the inside with a highly temperature-resistant conventional ceramic material (12). It comprises several devices (16) provided with gastight closures for receiving cooling agent tubes (17) equipped with spray nozzles (18). FIG. 1 shows only four of these openings (16) with their associated penetration through the ceramic material; however, several devices (16) of this type can be positioned at differing intervals from the narrow area (14), depending on the carbon black type to be produced and on the reaction time set as a consequence thereof. As shown in FIG. 1, the inner diameter of the cylindrical third zone (5) corresponds to that of the first zone (3). The end of the third zone of the reactor located in the direction of flow is connected in a known manner with succeeding apparatus such as heat exchange means, carbon black separation means and to conventional devices for further processing.

The long combustion chamber (2) can be for example 2400 mm and consists of an outer tube jacket with the same shape and same diameter as the first zone (3) of the reactor. It is jacketed like the latter with a thermally insulating layer (11) and a highly temperature-resistant layer (12), both conventional materials. Viewed in the direction of flow, it carries a closure plate (19) on its front end. It communicates openly on the outlet side in the manner described above with the inner area of the first zone (3) of the reactor. According to the invention, the axis of the combustion chamber (2) is in the same plane as the aligned axes of the three reactor zones.

The front plate (19) of the combustion chamber is connected to tubular T-piece (20). This component, jacketed on the inside with a ceramic material (21) has a length of, for example, 500 mm, an inner diameter of, for example, approximately 320 mm and carries a closure plate (22) on its front side which is equipped with a stuffing box (23) for receiving a longitudinally movable gas lance (24) or a corresponding tube provided with a nozzle for the introduction of burning oil. The third shank of the T-piece (20) is formed by a rather short tube section (25) which communicates with the conduit for the combustion air. The axis of this tube section, which has the function of supplying combustion air, is vertical or at 90° to the axis of the combustion chamber and is in a common plane with the latter.

FIG. 2 shows an embodiment of the reactor of the invention for the production of furnace carbon black which differs from the embodiment of FIG. 1 only in that the third zone (5) of the reactor exhibits a diverging or enlarging conical form in the direction of flow (see position 26) on the inside. In a successful embodiment, this cone has an inclination which is such that the inner diameter of the first zone is reached over a distance corresponding to 5.14 times the inner diameter of the first zone.

FIG. 3 illustrates the previously discussed combustion chamber parts, including the shape of the T-piece (20) described above for supplying the combustion air and of the feed device for a gaseous fuel.

FIG. 4 and FIG. 5, which shows the section in the plane B—B of FIG. 4, show details of a successful embodiment of the tip of the burnable gas lance (24). The tube (24) which supplies the burnable gas has an outer diameter of, for example, approximately 80 mm and is closed on the side facing the reactor by a plate (28). Twelve radially directed bores (27), each with a diameter of 9 mm and distributed approximately regularly over the tube circumference, are located as near as possible to this plate for the exit of gas.

FIG. 6 shows an alternative embodiment of the reactor. In FIG. 6 the constricting element of the reactor within constriction zone 4 has a tapering conical front portion and a divergently conical back portion.

Different settings for the production of activated and semiactivated carbon blacks are indicated in the following tables with the associated analytical qualities of the carbon black products obtainable thereby. The reactors with the dimensions of FIGS. 1 and 2 described above were used thereby.

As the examples of the following table show, furnace carbon blacks of very different qualities and types can be produced with the reactor of the invention.

| Example | carbon black quality | carbon black tape |
|---|---|---|
| 1 | SAF | N-121 |
| 2 | ISAF | N-220 |
| 3 | ISAF | N-234 |
| 4,5 | HAF | N-375 |
| 6,7 | HAF | N-339 |
| 8,9,10,11 | HAF | N-326 |
| 12,13 | FEF | N-550 |
| 14 | GPF | N-660 |

As a comparison of examples 6 and 7 shows, both the reactor in the embodiment of FIG. 1 as well as that of FIG. 2 yield correspondingly comparable results under essentially comparable conditions of use.

The described advantageous behavior of the reactor when various fuels are used is illustrated in examples 4,5 and in a certain manner in examples 10,11. As is apparent therefrom, both burnable gas and burning oil can be used as fuel without major changes being necessary in the conditions of use or without the quality of the carbon blacks produced, as expressed in the analytical values, essentially changing.

Another advantage of the reactor of the invention is illustrated in example 1. It shows that the obtention of very high carbon black structures, expressed in DBP values (according to ASTM D2414), is possible under the operating settings cited.

The reactor of the invention also makes possible an operation with oxygen-enriched combustion air preheated to very high temperatures. Example 2 shows the reactor conditions used here and the associated results.

It is frequently stressed that a stoichiometric ratio of total oxygen to burnable gas or burning oil, so that the combustion gases no longer contain any oxygen when they leave the combustion chamber, is desirable for economic reasons. If considerably more combustion air is introduced into the furnace carbon black process that is stoichiometrically necessary for combustion of the fuel added, the excess oxygen reacts with the carbon black oil added for cracking and thus reduces the yield of carbon black. Nevertheless, it is necessary in most instances to add such an excess of oxygen in relation to the stoichiometrically required amount in order to dilute the combustion gases so that a temperature is achieved which is low enough to protect the reactor wall. It was surprisingly found that the new reactor design, as example 1 illustrates, makes possible a troublefree continuous operation under stoichiometric conditions without disadvantageous effects.

Many different types of furnace carbon blacks can be produced with the reactor of the invention, both with normal, natural combustion air as well as with oxygen-enriched air. In the latter instance, when activated carbon black is being produced, as is shown in examples 4 to 9 and 11, the charge of the combustion gases with carbon black oil, in relation to the portion of combustion air added, attains very high values. In a reactor of customary design under these conditions the appearance of a considerable part of the added carbon black oil on the hot reactor wall with the then unavoidable formation of coke, adversely affects the carbon black. In conventional reactors, this adverse effect cannot be avoided or not avoided with sufficient assurance. In the reactor of the invention, however, the wall contact by carbon black oil does not occur at the settings provided in the examples cited, so that the advantageous enrichment of the combustion air with oxygen can be completely utilized without having to accept disadvantages due to the formation of coke and to its consequence.

The advantages which result from the enriching of the combustion air with oxygen are especially noticeable in the production of semiactive carbon blacks, as example 13 shows. However, as can be seen from examples 12 and 14, the specified advantages very clearly occur in the production of semiactive carbon blacks even without the addition of oxygen. The use of the reactor of the invention makes a very high oil charge possible here, which results in an especially economical method of production.

| Example | 1 | 2 | 3 | 4 | 5 |
|---|---|---|---|---|---|

-continued

| | | SAF | ISAF | ISAF | HAF | HAF |
|---|---|---|---|---|---|---|
| Carbon Black Quality | | SAF | ISAF | ISAF | HAF | HAF |
| Carbon Black Type | ASTM | N-121 | N-220 | N-234 | N-375 | N-375 |
| Reactor | | FIG. 1 | FIG. 2 | FIG. 1 | FIG. 1 | FIG. 1 |
| Combustion Air Amount | m³/h | 8000 | 8000 | 7600 | 8000 | 7700 |
| Combustion Air Temperature | K | 855 | 1078 | 865 | 890 | 885 |
| Oxygen | m³/h | — | 230 | — | 221 | 200 |
| Carbon Black Oil Quality | BMCI | 165 | 165 | 167 | 162 | 166 |
| Carbon Black Oil Amount | kg/h | 1725 | 2525 | 1675 | 2900 | 2980 |
| Carbon Black Oil Temperature | K | 423 | 420 | 425 | 423 | 420 |
| Burnable Gas Amount (Methane) | m³/h | 598 | 702 | 541 | — | 700 |
| Burning Oil Amount + | kg/h | — | — | — | 620 | — |
| Combustion Chamber Supply Pressure | mbar | 350 | 483 | 314 | 438 | 452 |
| Position Carbon Black Oil Nozzle | mm | −305 | 0 | −254 | +102 | +102 |
| Position of Water Nozzle* | mm | +813 M | +1778 G | +889 M | +1778 G | +1778 G |
| Oil Charge | g. oil/m³ | 215 | 315 | 220 | 362 | 387 |
| Carbon Black Amount | kg/h | 950 | 1550 | 976 | 1945 | 1934 |

| Example | | 6 | 7 | 8 | 9 | 10 |
|---|---|---|---|---|---|---|
| Carbon Black Quality | | HAF | HAF | HAF | HAF | HAF |
| Carbon Black Type | ASTM | N-339 | N-339 | N-326 | N-326 | N-326 |
| Reactor | | FIG. 2 | FIG. 1 | FIG. 1 | FIG. 1 | FIG. 1 |
| Combustion Air Amount | m³/h | 8000 | 8000 | 7000 | 7400 | 7800 |
| Combustion Air Temperature | K | 895 | 895 | 925 | 915 | 892 |
| Oxygen | m³h | 142 | 120 | 118 | 580 | — |
| Carbon Black Oil Quality | BMCI | 165 | 165 | 162 | 123 | 165 |
| Carbon Black Oil Amount | kg/h | 2905 | 2950 | 2503 | 3805 | 2520 |
| Carbon Black Oil Temperature | K | 421 | 423 | 420 | 422 | 428 |
| Burnable Gas Amount (Methane) | m³h | 698 | 702 | 498 | 655 | 786 |
| Burniing Oil Amount + | kg/h | — | — | — | — | — |
| Combustion Chamber Supply Pressure | mbar | 500 | 463 | 350 | 485 | 395 |
| Position of Carbon Black Oil Nozzle | mm | +102 | +102 | −51 | 0 | +51 |
| Position of Water Nozzle* | mm | +1778 M | +1778 G | +2438 G | +3505 G | +3505 G |
| Oil Charge | g. oil /m³ | 363 | 367 | 357 | 513 | 323 |
| Carbon Black Amount | kg/h | 1920 | 1952 | 1680 | 2356 | 1848 |

| Example | | 11 | 12 | 13 | 14 |
|---|---|---|---|---|---|
| Carbon Black Quality | | HAF | FEF | FEF | GPF |
| Carbon Black Type | ASTM | N-326 | N-550 | N-550 | N-660 |
| Reactor | | FIG. 2 | FIG. 1 | FIG. 1 | FIG. 1 |
| Combustion Air Amount | m³/h | 8000 | 7200 | 7200 | 6900 |
| Combustion Air Temperature | K | 886 | 920 | 925 | 935 |
| Oxygen | m³h | 50 | — | 580 | — |
| Carbon Black Oil Quality | BMCI | 162 | 123 | 123 | 125 |
| Carbon Black Oil Amount | kg/h | 3405 | 3905 | 5410 | 3895 |
| Carbon Black Oil Temperature | K | 425 | 425 | 425 | 423 |
| Burnable Gas Amount (Methane) | m³/h | — | 353 | 480 | 340 |
| Burning Oil Amount + | kg/h | 605 | — | — | — |
| Combustion Chamber Supply Pressure | mbar | 448 | 92 | 326 | 84 |
| Position of Carbon Black Oil Nozzle | mm | 0 | 0 | 0 | 0 |
| Position of Water Nozzle* | mm | +4470 G | +5944 M | +5944 M | +5944 M |
| Oil Charge | g. oil/m³ | 426 | 542 | 751 | 565 |
| Carbon Black Amount | kg/h | 2403 | 2580 | 3580 | 2710 |

+ petrochemical oil with BMCI = 126 was added
*direction of spray: M = with current; G-counter to current

| Example | | | 1 | 2 | 3 | 4 | 5 |
|---|---|---|---|---|---|---|---|
| Carbon Black Quality | | | SAF | ISAF | ISAF | HAF | HAF |
| Carbon Black Type | ASTM | | N-121 | N-220 | N-234 | N-375 | N-375 |
| Reactor | | | FIG. 1 | FIG. 2 | FIG. 1 | FIG. 1 | FIG. 1 |
| Iodine Adsorption | ASTM D1510 | mg/g | 121 | 122 | 120 | 92 | 90 |
| DBP Number | ASTM D2414 | ml/100 g | 164* | 115 | 125 | 114 | 114 |
| Strength of Color | ASTM D3265 | | 121 | 116 | 126 | 116 | 115 |
| CTAB Number | ASTM D3765 | m²g | 122 | 110 | 121 | 97 | 96 |
| 24M4-DBP-Number | ASTM D3493 | ml/100 g | 135* | 97 | 101 | 96 | 96 |

| Example | | | 6 | 7 | 8 | 9 | 10 |
|---|---|---|---|---|---|---|---|
| Carbon Black Quality | | | HAF | HAF | HAF | HAF | HAF |
| Carbon Black Type | ASTM | | N-339 | N-339 | N-326 | N-326 | N-326 |
| Reactor | | | FIG. 2 | FIG. 1 | FIG. 1 | FIG. 1 | FIG. 1 |
| Iodine Adsorption | ASTM D1510 | mg/g | 90 | 90 | 82 | 81 | 80 |
| DBP Number | ASTM D2414 | ml/100 g | 119 | 120 | 72 | 71 | 71 |
| Strength of Color | ASTM D3265 | | 110 | 110 | 113 | 111 | 110 |
| CTAB Number | ASTM 3493 | ml/100 g | 94 | 95 | 84 | 83 | 82 |
| 24M4-DBP-Number | ASTM D3493 | ml/100 g | 99 | 101 | 72 | 70 | 69 |

| Example | | 11 | 12 | 13 | 14 |
|---|---|---|---|---|---|
| Carbon Black Quality | | HAF | FEF | FEF | GPF |
| Carbon Black Type | ASTM | N-326 | N-550 | N-550 | N-660 |
| Reactor | | FIG. 2 | FIG. 1 | FIG. 1 | FIG. 1 |

-continued

| | | | | | | |
|---|---|---|---|---|---|---|
| Iodine Adsorption | ASTM D1510 | mg/g | 82 | 45 | 44 | 36 |
| DBP Number | ASTM D2414 | ml/100 g | 73 | 118 | 120 | 90 |
| Strength of Color | ASTM D3265 | | 112 | — | — | — |
| CTAB Number | ASTM D3493 | ml/100 g | 84 | 44 | 43 | 36 |
| 24M4-DBP-Number | ASTM D3493 | ml/100 g | 70 | 86 | 86 | 77 |

*value intentionally driven up

Further variations and modifications of this invention will be apparent to those skilled in the art from the foregoing and are intended to be encompassed by the claims appended hereto.

We claim:

1. A reactor for producing furnace carbon black by thermal decomposition of liquid hydrocarbons in hot combustion gases, comprising:

an elongated reactor member having a forward end, a rearward end, a longitudinal median axis, and an interior jacket of fire resistant material, said jacket having in sequence from said forward end to said rearward end, a first reactor section, a second constricting reactor section and a third reactor section, said reactor member further including filler means for filling in a portion of said first reactor section, said filler means having a rearward wall and a forward wall with said forward wall being essentially coincident with the forward end of said reactor member;

said first reactor section having an inner wall defining a cylindrical channel therein with the channel having a first end coincident with the rearward wall of said filler means, a median channel axis coincident with the longitudinal median axis of said reactor member and a second end, said first reactor section also having an internal surface defining a laterally extending bore with the bore opening into the channel and extending out to and through a peripheral portion of said reactor member, said bore being positioned rearwardly of the rearward wall of said filler means and forwardly of the second end of said channel, and a portion of the inner wall defining the channel rearward of the bore and forward of the second end of the channel being in a transverse relationship with the internal surface defining the bore such that a sharp edge is formed at the intersection of the inner wall and the internal surface;

said second constricting reactor section including an inner wall defining a through-hole, the through-hole opening into the channel in said first reactor section and having a central axis coinciding with the median axis of the channel in said first reactor section, a first portion of the through-hole having a cross-sectional area which, in the direction from the forward end towards the rearward end of said reactor member, symmetrically constricts;

said third reactor section including an inner wall defining a channel therethrough, the channel opening into the through-hole of said second constricting reactor section and having a cross-sectional area along its entire length equal to or greater than the cross-sectional area of the through-hole at the junction of said second constricting reactor section and said third reactor section;

spray nozzle means extending into the channel in said third reactor section for introducing a liquid quenching medium;

a moveable lancelike spray device for introducing carbon black raw material into said reactor member supported by said reactor member and extending into the forward end of said reactor member along the longitudinal median axis of said reactor member;

means defining a combustion chamber having a first open end and an end wall essentially closing the other end, with the open of said combustion chamber connected to said reactor member such that a median axis of said combustion chamber coincides with a median axis of the bore in said first reactor section, and the median axis of the bore formed in said first reactor section intersects and is essentially perpendicular to the median axis of the channel formed in said first reactor section such that combustion gases passing through said combustion chamber impact on the inner wall defining said cylindrical channel and thus are abruptly deflected in passing from said combustion chamber towards said second constricting reactor section.

2. The reactor according to claim 1, wherein said combustion chamber has a flanged end portion surrounding said first open end and said reactor member has a flanged extension surrounding the bore in said first reactor section and said flanged end portion and said flanged extension are releasably connected to one another.

3. The reactor according to claim 1 further comprising fuel introduction means extending through the end wall of said combustion chamber and movable with respect thereto.

4. The reactor according to claim 1, wherein said combustion chamber is cylindrical in shape and said combustion chamber further includes air conduit means for introducing air into said chamber in a direction which is essentially perpendicular to the median axis of said combustion chamber.

5. The reactor according to claim 1, wherein the first portion of the through-hole in said second constricting reactor section is conical in shape.

6. The reactor according to claim 5, wherein the through-hole in said second constricting reactor section is defined as having a second portion which is cylindrical in shape and opens into the first portion at one end and into the channel of said third reactor section at the other end.

7. The reactor according to claim 5, wherein the through-hole in said second constricting reactor section is defined as having a second portion which is conical in shape, increasing in cross-sectional area in the direction from the forward end to the rearward end and said second portion having a first end which opens into the first portion and a second end which opens into the channel of said third reactor section.

8. A reactor according to claim 1 wherein the internal surface defining the lateral bore is circular in cross-section and said combustion chamber includes an internal surface which is circular in cross-section, radially surrounds the median axis of said combustion chamber, and is of a diameter which corresponds to that of the internal surface defining the lateral bore.

9. A reactor for producing furnace carbon black by thermal decomposition of liquid hydrocarbons in hot combustion gases, comprising:

an elongated reactor member having a forward end, a rearward end, a longitudinal median axis, and an interior jacket of fire resistant material, said jacket having in sequence from said forward end to said rearward end, a first reactor section, a second constricting reactor section and a third reactor section, said reactor member further including filler means for filling in a portion of said first reactor section, said filler means having a rearward wall and a forward wall with said forward wall being essentially coincident with the forward end of said reactor member;

said first reactor section having an inner wall defining a cylindrical channel therein with the channel having a first end coincident with the rearward wall of said filler means, a medium channel axis coincident with the longitudinal median axis of said reactor member and a second end, said first reactor section also having an internal surface defining a laterally extending bore with the bore opening into the channel and extending out to and through a peripheral portion of said reactor member, said bore being positioned rearwardly of the rearward wall of said filler means and forwardly of the second end of the channel, and a portion of the inner wall defining the channel rearward of the bore and forward of the second end of the channel being in a transverse relationship with the internal surface defining the bore such that a sharp edge is formed at the intersection of the inner wall and the internal surface;

said second constricting reactor section including an inner wall defining a through-hole, the through-hole opening into the channel in said first reactor section and having a central axis coinciding with the median axis of the channel, and a portion of said through-hole having a cross-sectional area which, in the direction from the forward end towards the rearward end of said reaction member, symmetrically constricts;

said third reactor section including an inner wall defining a conical channel therethrough, the conical channel opening into the through-hole of said second constricting reactor section and having a cross-sectional area which increases in the direction from the forward end towards the rearward end of said reactor member, the conical channel in said third reactor section and the through-hole in said second constricting reactor section having a cross-sectional area at the junction of said third reactor section and said second constricting reactor section which is essentially equal;

spray nozzle means extending into the channel in said third reactor section for introducing a liquid quenching medium;

a movable lancelike spray device for introducing carbon black raw material into said reactor member supported by said reactor member and extending into the forward end of said reactor member along the longitudinal median axis of said reactor member;

means defining a combustion chamber having a first open end and an end wall essentially closing the other end, with the open end of said combustion chamber connected to said reactor member such that a median axis of said combustion chamber coincides with a median axis of the bore in said first reactor section, and the median axis of the bore formed in said first reactor section intersects and is essentially perpendicular to the median axis of the channel formed in said first reactor section such that combustion gases passing through said combustion chamber impact on the inner wall defining said cylindrical channel and thus are abruptly deflected in passing from said combustion chamber towards said second constricting reactor section.

10. A reactor for producing furnace carbon black by thermal decomposition of liquid hydrocarbons in hot combustion gases, comprising:

an elongated reactor member having a forward end, a rearward end, a longitudinal median axis, and an interior jacket of fire resistant material, said jacket having in sequence from said forward end to said rearward end, a first reactor section, a second constricting reactor section and a third reactor section;

said first reactor section having an inner wall defining cylindrical channel therein with the channel having a first end generally coincident with the forward end of said reactor member, a median channel axis coincident with the longitudinal median axis of said reactor member and a second end, said first reactor section further including an internal surface defining a laterally extending bore with the bore opening into the channel and extending out to and through a peripheral portion of said reactor member, said bore being positioned rearwardly of the forward end of said reactor member and forwardly of the second end of said channel, and a portion of the inner wall defining the channel rearward of the bore and forward of the second end of the channel being in a transverse relationship with the internal surface defining the bore such that a sharp edge is formed at the intersection of the inner wall and the internal surface;

said second constricting reactor section including an inner wall defining a through-hole, the through-hole opening into the channel in said first reaction section, a first portion of the through-hole having a cross-sectional area which, in the direction from the forward end towards the rearward end of said reactor member, symmetrically constricts;

said third reactor section including an inner wall defining a channel therethrough, the channel opening into the through-hole of said second constricting reactor section;

means extending into the channel in said third reactor section for introducing a liquid quenching medium;

means for introducing carbon black raw material into said reactor member supported by said reactor member and extending into the forward end of said reactor member along the longitudinal median axis of said reactor member;

means defining a combustion chamber having a first open end and an end wall essentially closing the other end, with the open end of said combustion chamber connected to said reactor member such that a median axis of said combustion chamber coincides with a median axis of the lateral bore in said first reactor section, and the median axis of said combustion chamber and the longitudinal median axis of said reactor member lie on a common plane and intersect at about a right angle such that combustion gases passing through said combustion chamber impact on the inner wall defining said cylindrical channel and thus are abruptly deflected in passing from said combustion chamber towards said second constricting reactor section.

* * * * *